US008413906B2

(12) United States Patent
Abd Alla et al.

(10) Patent No.: US 8,413,906 B2
(45) Date of Patent: Apr. 9, 2013

(54) COUNTERMEASURES TO SECURE SMART CARDS

(75) Inventors: Hanan Ahmed Hossni Mahmoud Abd Alla, Riyadh (SA); Khaled Soliman Alghathbar, Riyadh (SA)

(73) Assignee: King Saud University, Riyadh (SA)

( * ) Notice: Subject to any disclaimer, the term of this patent is extended or adjusted under 35 U.S.C. 154(b) by 115 days.

(21) Appl. No.: 13/113,073

(22) Filed: May 22, 2011

(65) Prior Publication Data

US 2012/0292391 A1 Nov. 22, 2012

(51) Int. Cl.
*G06K 19/06* (2006.01)
(52) U.S. Cl.
USPC .......................................... 235/492; 235/487
(58) Field of Classification Search .................. 235/375, 235/379, 487, 492
See application file for complete search history.

(56) References Cited

U.S. PATENT DOCUMENTS

| | | | |
|---|---|---|---|
| 6,742,712 B1 * | 6/2004 | Kawaguchi et al. | 235/492 |
| 7,055,033 B2 | 5/2006 | Guthery | |
| 7,162,033 B1 | 1/2007 | Coron | |
| 7,248,717 B2 | 7/2007 | Rhoads | |
| 7,257,708 B2 | 8/2007 | Guthery | |
| 7,516,884 B2 * | 4/2009 | Chase-Salerno et al. | 235/380 |
| 7,620,823 B2 | 11/2009 | Kim | |
| 2002/0034297 A1 | 3/2002 | Rhoads | |
| 2003/0154389 A1 | 8/2003 | Peeters et al. | |
| 2004/0145339 A1 | 7/2004 | Dischamp | |
| 2006/0153372 A1 | 7/2006 | Kim et al. | |
| 2010/0100748 A1 | 4/2010 | Hubert | |
| 2012/0110292 A1 * | 5/2012 | Martini | 711/163 |

FOREIGN PATENT DOCUMENTS

| | | |
|---|---|---|
| JP | 2001230771 A | 8/2001 |
| WO | 2006/067665 A1 | 6/2006 |

OTHER PUBLICATIONS

Mahmoud, et al., "Novel Algorithmic Countermeasures for Differential Power Analysis Attacks on Smart Cards", 2010 Sixth International Conference on Information Assurance and Security, IEEE, pp. 52-55.
Messerges, et al. "Investigations of Power Analysis Attacks on Smartcards", USENIX Workshop on Smartcard Technology, Chicago, Illinois, May 10-11, 1999, 12 pp.
Van Woudenberg, et al., "Improving Differential Power Analysis by Elastic Alignment", 17 pp.
Karthikeyan, et al., "The New Approach of Secure Protocol in Smart Card using Hybrid Encryption Technique", ICFAI Journal of System Management, vol. IV, Issue 4, 2006.
Moore, et al., "Improving Smart Card Security Using Self-Timed Circuits", Computer Laboratory, University of Cambridge, 8 pp.
Hasan, M.A. "Power Analysis Attacks and Algorithmic Approaches to their Countermeasures for Koblitz Curve Crypto-Systems", Dept. of Electrical and Computer Engineering, University of Waterloo, 21 pp.

* cited by examiner

*Primary Examiner* — Christle Marshall
(74) *Attorney, Agent, or Firm* — Hart IP Law & Strategies (57) ABSTRACT

The present disclosure introduces a new technique for hiding sensitive information in smart cards. A smartcard system relying on stegnography rather than cryptography may act as a countermeasure to prevent extraction of cryptographic information such as passwords. In one embodiment, the smart card system of the present disclosure may be used to authenticate a smart card user. A password may be stored within a hidden memory location of a smart card. A smart card may interface with an external device. Data representing the hidden memory location of the stored password may be transmitted to an external device. Access to the hidden memory location of the smart card by the external device may be allowed. The password stored within the smart card memory is compared to input data entered into the external device. If the input data matches the password stored within the smart card, a user may be authenticated.

23 Claims, 7 Drawing Sheets

COUNTERMEASURES TO SECURE SMART CARDS

TECHNICAL FIELD

The present disclosure relates generally to computer systems, and more particularly, systems and methods to secure data stored on smart card devices.

BACKGROUND

A smart card may dissipate different amounts of power according to the instructions it is executing. Switching current drawn by the transistors of a smart card may vary along the logic path for different instructions it executes. It is possible to gain knowledge of internal algorithms being used in smart cards simply by examining its power traces. Advanced statistical techniques including differential power analysis, can detect small power variations in processing devices to identify individual bits. This can result in secret key information being extracted from smart cards during the execution of computation. If sensitive information such as a password is transmitted during computation, the stored password may become compromised.

SUMMARY

The present disclosure introduces a new technique for hiding sensitive information in smart cards. A smartcard system relying on stegnography rather than cryptography may act as a countermeasure to prevent extraction of cryptographic information such as passwords.

In one embodiment, the smart card system of the present disclosure may be used to authenticate a smart card user. A password may be stored within a hidden memory location of a smart card. A smart card may interface with an external device. Data representing the hidden memory location of the stored password may be transmitted to an external device. Access to the hidden memory location of the smart card by the external device may be allowed. The password stored within the smart card memory is compared to input data entered into the external device. If the input data matches the password stored within the smart card, a user may be authenticated.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Various embodiments will now be described in detail with reference to the accompanying drawings, in which.

DETAILED DESCRIPTION

The following detailed description is divided into several sections. A first section presents a system overview. A next section provides methods of using example embodiments. The following section describes example implementations. The next section describes the hardware and the operating environment in conjunction with which embodiments may be practiced. The final section includes the claims.

System Level Overview

Figure 1:
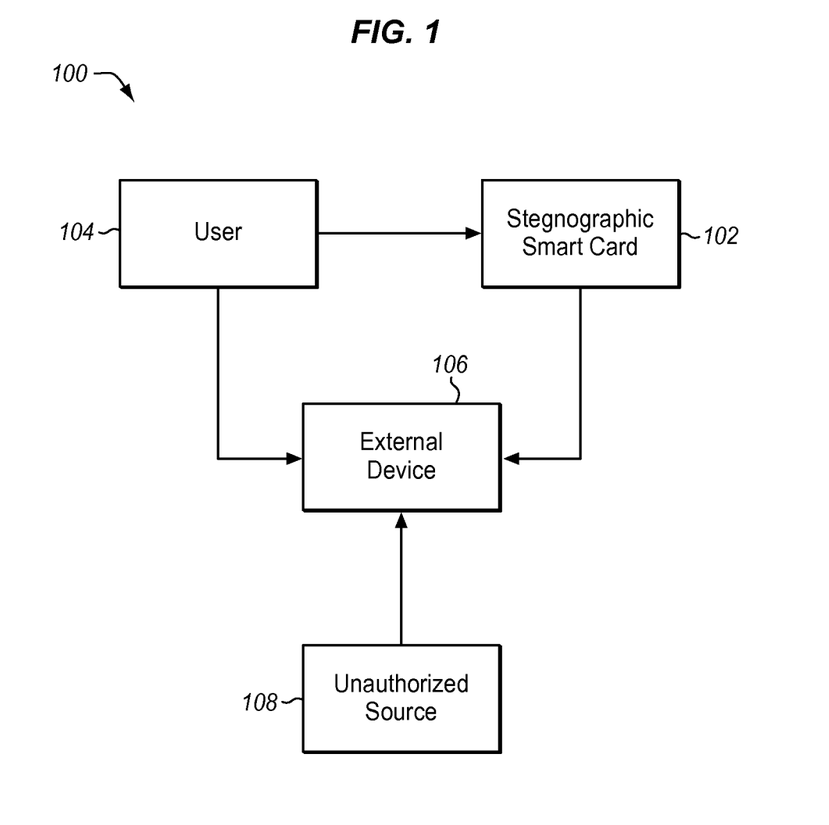
FIG. 1 is a block diagram illustrating a general overview of a smart card authentication system, according to an example embodiment.

FIG. 1 comprises a block diagram illustrating a general overview of a smart card authentication system 100, according to an example embodiment. Generally, the smart card authentication system 100 may be used to securely authenticate a user without exposing sensitive information such as passwords during Differential Power Analysis (DPA) attacks. The smart card authentication system 100 of this example comprises a stegnographic smart card 102, a user 104, an external device 106, and an unauthorized source 108. The smart card authentication system 100 introduces a smart card system that relies on stegnography instead of cryptography. By incorporating an algorithmic extension that does not require any new hardware design or alteration to existing smart cards, the smart card authentication system 100 may prevent unauthorized access to sensitive information.

Sensitive information may be hidden within the memory of a smart card device 102. The memory location of the sensitive information may be stored, and the memory location where the sensitive information is hidden may be accessed during secure authentication. During a DPA attack, an unauthorized source may only be able to decipher the physical location of the sensitive information hidden in a smart card memory location. The actual sensitive information may not be accessed without actual possession of the smart card.

The stegnographic smart card 102 may be any device containing a microprocessor capable of processing data. The microprocessor may be used to enforce access to the data within the stegnographic smart card 102. Sensitive information may be stored within a memory location of the stegnographic smart card 102. The memory location where the sensitive information may be stored can be volatile memory or non-volatile memory. In one embodiment, the sensitive information may be hard-wired into the memory of the stegnographic smart card 102. In another embodiment, the sensitive information may be hidden in a file within the memory of the stegnographic smart card 102. The location of the sensitive information hidden in the smart card memory may be encrypted. In one embodiment, a secret key is produced disguising the location of the sensitive information. Through decryption of the secret key, the location of the sensitive information may be accessed.

The stegnographic smart card 102 may interface with an external device 106. An external device 106 may be any device capable of reading and or processing data. In one embodiment, the external device 106 provides an external power supply for the stegnographic smart card 102, allowing data to be read from the stegnographic smart card 102. The smart card may use a serial interface and receive its power from the external device 106. A user 104 may communicate with an external device 106 utilizing the stegnographic smart card 102 to authenticate. A user 104 may be any persons or entity having authorized access to the stegnographic smart card 102. The user 104 may have physical possession of the stegnographic smart card 102. The sensitive information hidden in the memory of the stegnographic smart card 102 may be used to authenticate the user 104. In one embodiment, a user 104 may be the owner of the stegnographic smart card 102. The user may have legal access to the sensitive information stored in the memory of the stegnographic smart card 102.

The user 104 may enter input data such as a password into an external device 106. Alternatively, the user 104 may enter input data directly into the stegnographic smart card 102. The input data entered by the user 104 may be compared to the sensitive data stored in a memory location of the stegnographic smart card 102. If the input data entered into the external device 106 by the user 104 matches the sensitive information stored in a memory location of the stegnographic smart card 102, the user 104 is authenticated.

The external device 106 interacts with both the stegnographic smart card 102 and user 104. As previously mentioned, an external device 106 may be any device capable of reading and or processing data, including but not limited to computer systems. In one embodiment, the external device 106 may be a smart card acceptor device. The smart card acceptor device may be any device acting as a communication medium between the stegnographic smart card 102 and a host. In another embodiment, the smart card acceptor device may be linked to another external device 106 such as a computer for the purpose of authenticating the user 104. The external device 106 may accept input data from the user 104.

The stegnographic smart card 102 may send the encrypted location of the sensitive information hidden in the smart card memory to the external device 106. Upon receiving a transmission from the stegnographic smart card 102 containing the encrypted location of the sensitive information, the external device 106 may decrypt the location of the sensitive information stored in the memory of the stegnographic smart card 102. The stegnographic smart card 102 may further communicate with the external device 106 returning the value of the sensitive hidden information in the smart card memory. External device 106 may conduct the comparison of the value of the input data entered by the user 104 and the value of the sensitive information hidden in the smart card memory of the stegnographic smart card 102. If the external device determines that the values match, the user 104 may be authenticated and the stegnographic smart card 102 may be accepted.

An unauthorized source 108 may attempt to compromise the authentication process during the communication of the stegnographic smart card 102 and the external device 106. In one embodiment, DPA attacks may measure power dissipation that leaks during deciphering of the encrypted location of the sensitive information stored in the stegnographic smart card 102 memory. This may allow unauthorized knowledge to be gained regarding the location where the sensitive information is hidden in the memory of the stegnographic smart card 102. However, the sensitive information stored in the memory of the stegnographic smart card 102 remains protected and cannot be accessed without actual possession of the smart card.

Figure 2:
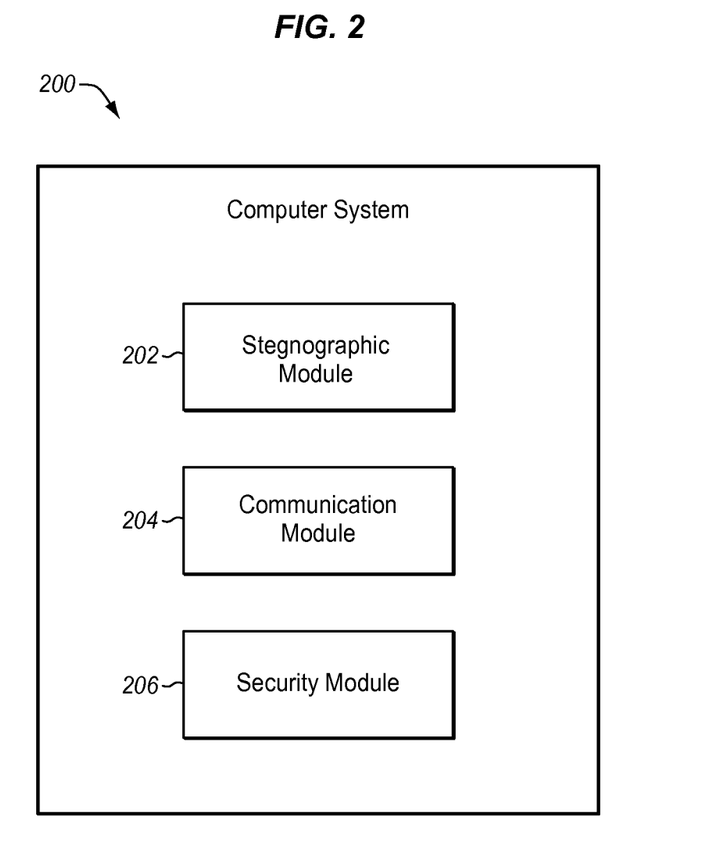
FIG. 2 is a block diagram illustrating a computer system to authenticate a smart card user, according to an example embodiment.

FIG. 2 comprises a block diagram illustrating a computer system to authenticate a smart card user, according to an example embodiment. The computer system is an example embodiment of the smart card authentication system 100 described in FIG. 1. Block 200 comprises a stegnographic module (block 202), a communication module (block 204), and a security module (block 206).

The stegnographic module 202 may be used to hide a password stored in a memory location of a smart card (such as the stegnographic smart card 102 described in FIG. 1). The memory location where the password may be stored can be volatile memory or non-volatile memory. In one embodiment, the password may be hard-wired into the memory of the smart card. In another embodiment, the sensitive information may be hidden in a file within the memory of the smart card. In yet another embodiment, a one-time stegnographic password may be created where the place of hiding may be changed each time the smart card is used in order to hinder physical attacks if the smart card may be stolen immediately after use.

The communication module 204 may allow a smart card to interact/interface with an external device (such as the external device 106 described in FIG. 1). In one embodiment, the external device may be a smart card acceptor device used to read a smart card. Specifically, upon authentication of a user (such as the user 104 described in FIG. 1), the communication module 204 may allow the external device to access the memory location of the smart card where the hidden password is stored. A user 104 may enter input data into an external device 106 such as a password that may be compared to the password hidden in a memory location of the smart card. In one embodiment, the smart card may send the location of an encrypted smart card key from its memory to the external device 106. Once the location of the password file has been decrypted, the communication module 204 may be used to compare the input data entered by a user 104 to the password hidden in the memory of the smart card. If there is a match, a user may be authenticated and the smart card accepted.

The security module 206 may be used to encrypt and decrypt the memory location of the password stored within the smart card. Once the stegnographic module 202 stores the password in the smart card memory, the security module 206 may be used to encrypt the location of the password. In one embodiment, the security module 206 may create a stegnographic key corresponding to the address of the password file in the smart card memory. An external device (such as the external device 106 described in FIG. 1) may decrypt this stegnographic key. The location of the stegnographic key may be decrypted by the security module 206 utilized by an external device 106.

Exemplary Methods

In this section, particular methods to secure data on a smart card device and example embodiments are described by reference to a series of flow charts. The methods to be performed constitute computer programs made up of computer-executable instructions.

Figure 3:
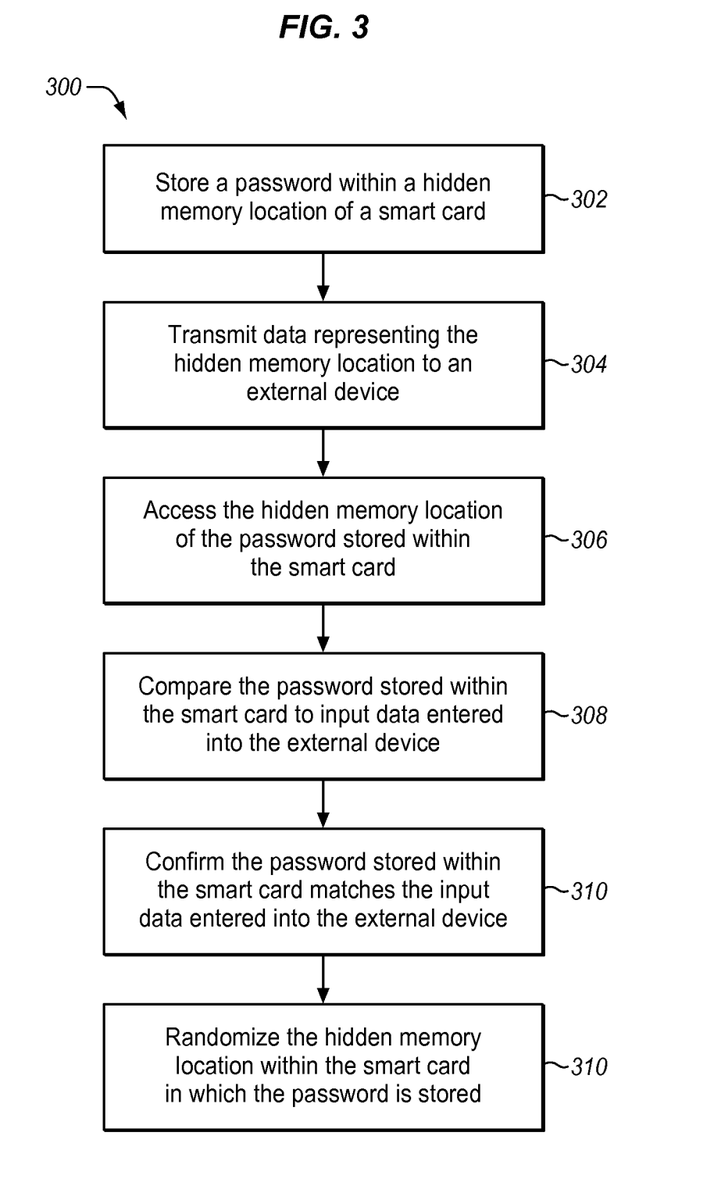
FIG. 3 is a block diagram illustrating a method to authenticate a smart card user, according to an example embodiment.

FIG. 3 is a block diagram illustrating a method to authenticate a smart card user, according to an example embodiment. The method 300 represents one embodiment of a smart card authentication system such as the smart card authentication system 100 described in FIG. 1. The method 300 may be implemented by storing a password within a hidden memory location of a smart card (block 302), transmitting data representing the hidden memory location of the password stored within the smart card to an external device (block 304), allowing access to the hidden memory location of the password stored within the smart card (block 306), and comparing the password stored within the smart card to input data entered into the external device (block 308).

A password is stored within a hidden memory location of a smart card at block 302. The memory location within the smart card where the password may be stored can be either volatile memory or non-volatile memory. In one embodiment, the memory location may be hidden using encryption. A stegnographic key may be produced corresponding to the address in the memory location where the password is hidden.

Data representing the hidden memory location of the stored password is transmitted to an external device at block 304. In one embodiment, the external device may be a smart card acceptor device. A smart card such as the stegnographic smart card 102 described in FIG. 1, may send the encrypted location of the password from its memory to a smart card acceptor device. The smart card acceptor device may act as an external power supply, reading the encrypted data from the smart card.

Access to the hidden memory location of the password stored within the smart card is allowed at block 306. In one embodiment, the external device decrypts the hidden memory location of the smart card. At block 308, the password stored within the smart card is compared to input data entered into the external device. Input data may be entered by a user such as a user 104 as described in FIG. 1. In one embodiment, pass transistor technology may be utilized to compare the data. Block 308 may further comprise utilizing an XOR gate to match the password stored in the smart card to the input data entered into the external device. Alternatively, transmissions gate technology may be incorporated instead of pass transistor technology.

An alternative embodiment to FIG. 3 further comprises confirming the password stored within the smart card matches the input data entered into the external device. If the password stored within the smart card matches the input data entered into the external device, a user 104 may be authenticated and the smart card accepted. Yet another alternative embodiment to FIG. 3 includes randomizing the hidden memory location of the smart card in which the password is stored. A one-time stegnographic password may be produced where the memory location where the password is stored is changed every time the smart card is used.

Figure 4:
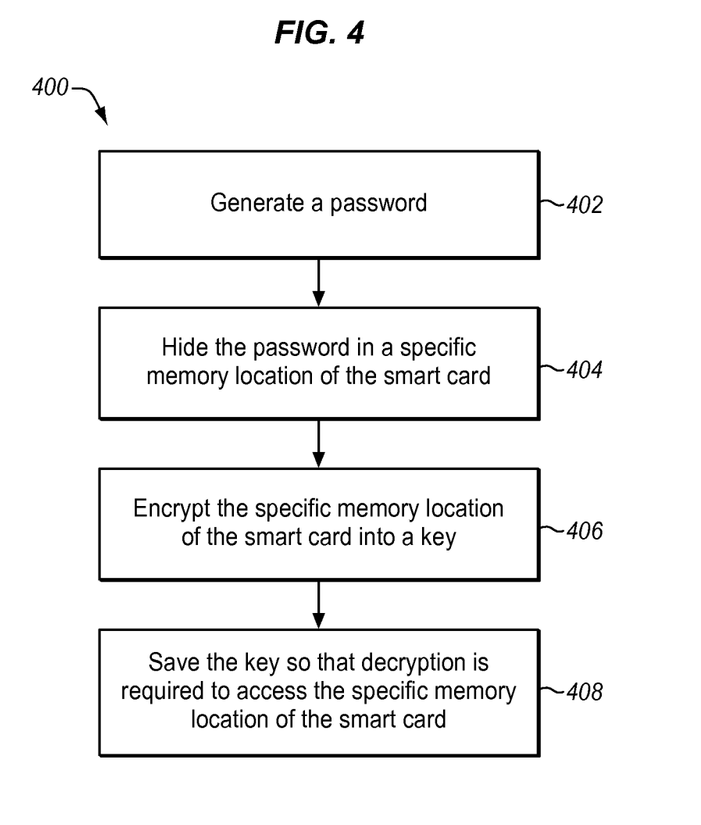
FIG. 4 is a block diagram illustrating a method to program a password into a smart card, according to an example embodiment.

FIG. 4 is a block diagram illustrating a method to program a password into a smart card, according to an example embodiment. The method 400 represents one embodiment of a smart card authentication system such as the smart card authentication system 100 described in FIG. 1. The method 400 may be implemented by generating a password (block 402), hiding the password in a specific memory location of a smart card (block 404), generating a smart card encrypted key corresponding to the specific memory location of the password (block 406), and saving the key so that decryption is required to access the specific memory location of the smart card (block 408).

A password is generated at block 402. In one embodiment, the password may be pre-loaded into the smart card prior to initial use. In another embodiment, the generation of a password may occur repeatedly. The user 104 (as referenced in FIG. 1) may continuously generate new passwords to replace an existing password hidden in the smart card memory. A new password may be generated in the same memory location as the existing password. Alternatively, the memory location of a generated password may change.

The password is hidden in a specific memory location of a smart card at block 404. The password may be stored in either volatile or non-volatile memory of a smart card. The password may be hard-wired into the memory of the smart card device or stored in a file located at a specific memory location. Hiding of the password occurs by encrypting the specific memory location of the password.

The specific memory location of the smart card is encrypted generating a stegnographic smart card key at block 406. The smart card may send the encrypted location of the generated smart card key from its memory to an external device 106 (as referenced in FIG. 1) for decryption. In one embodiment, the smart card key is loaded into the smart card during initialization of the smart card.

The key is saved so that decryption is required to access the specific memory location of the smart card at block 408.

Exemplary Implementations

Various examples of computer systems and methods for embodiments of the present disclosure have been described above. Listed and explained below are alternative embodiments, which may be utilized in smart card security. Specifically, example embodiments of algorithms implementing stegnography security as described in the present disclosure are listed below.

Algorithms:
  Algorithm to add a password (Account-Id A, password P, BitArray Steg, address Addr)
  1. Input the password P;
  2. Call stegnographic module (Steg, P, address);
  3. Encrypt address into key; and
  4. Save the key in place Addr.
  Algorithm stegnographic module (Steg, P, address);
  1. Hide P in Steg;
  2. Get the address where P is hidden (It can be the key to resolve the stegnography algorithm).
  Algorithm Authenticate (password P)
  1. User input the password P;
  2. Decrypt (address),
  3. Extract the hidden password P;
  4. X=Compare (P,P1)// using XOR;
  5. If X=0 then P=P1 and authenticate the user.

Figure 5:
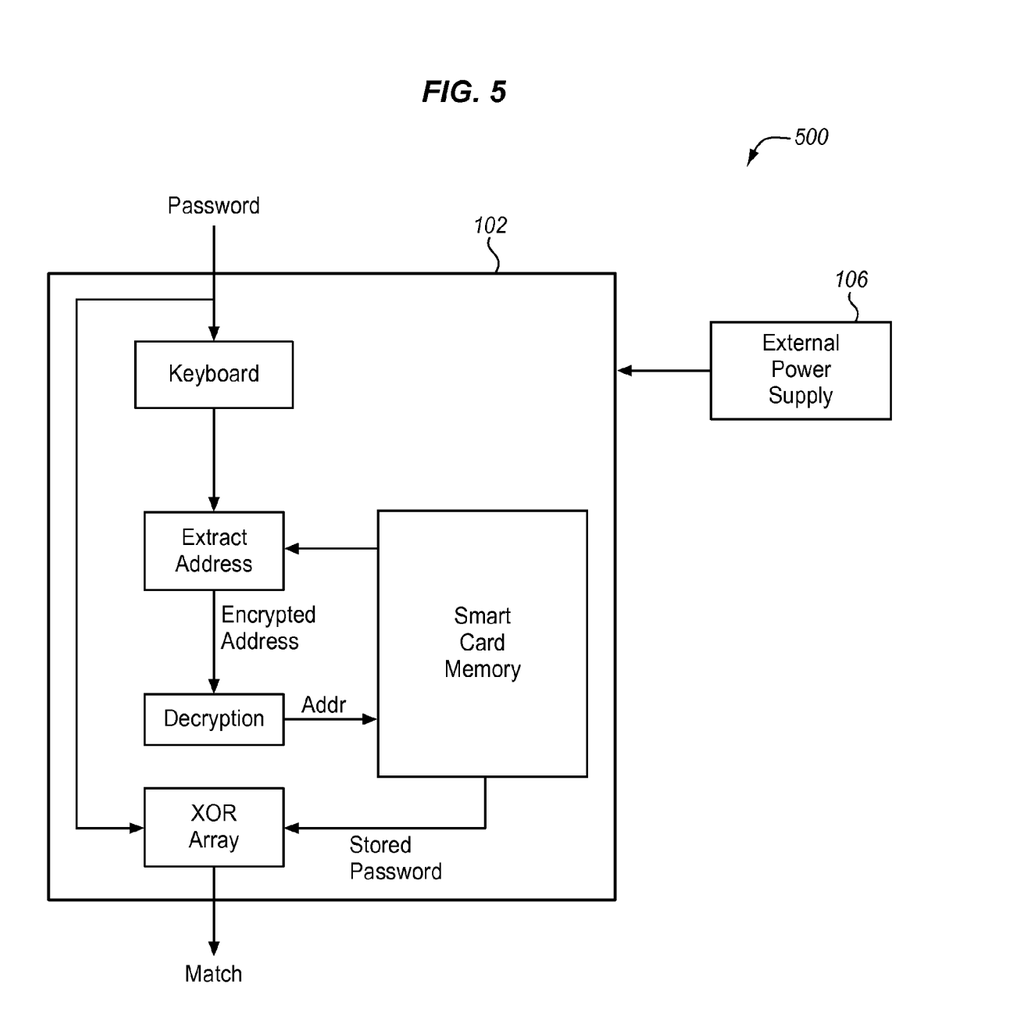
FIG. 5 is a block diagram illustrating a stegnosystem smart card device, according to an example embodiment.

Furthermore, FIG. 5 is a block diagram illustrating a stegnosystem smart card, according to an example embodiment (block 500). The stegnosystem smart card represents one embodiment of the stegnographic smart card 102 described in FIG. 1. The stegnosystem smart card may connect to an external device (such as the external device 106 described in FIG. 1). In one embodiment, the external device may be an external power supply providing a power source for the stegnographic smart card 102.

Figure 6:
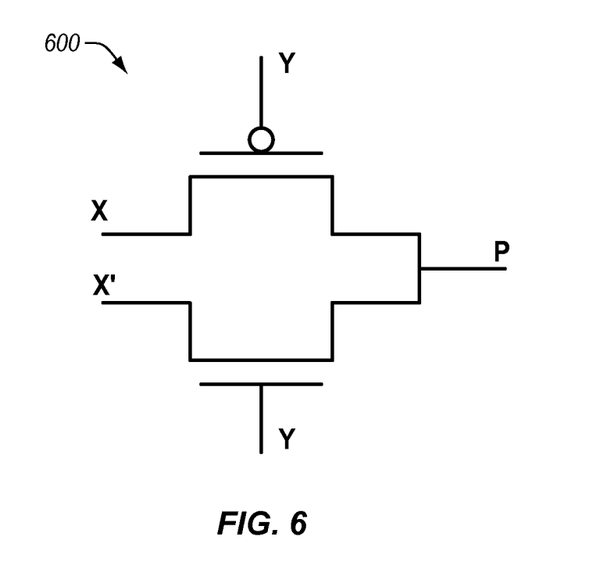
FIG. 6 is a perspective view illustrating a design of an XOR gate utilized by a stegnosystem smart card device, according to an example embodiment.

FIG. 6 is a perspective view illustrating a design of an exclusive-or (XOR) gate utilized by a stegnosystem smart card device, according to an example embodiment (block 600). Incorporating block 600 into a stegnographic smart card 102 (as referenced in FIG. 1), may be useful in preventing invasive attacks (no physical possession of the key) on smart cards. The information extracted by an invasive attack may be rendered useless because a user 104 (as referenced in FIG. 1) provides the password that will then be XOR'd by the value stegnographed in the stegnographic smart card 102 to register a match. The transistor transitions illustrated in block 600 remain the same in both cases for inputs 00 and 11. In alternative embodiments, different designs for XOR gates may also be incorporated as long as power traces generated by the transistors remain the same for inputs 00 and 11.

Figure 7:
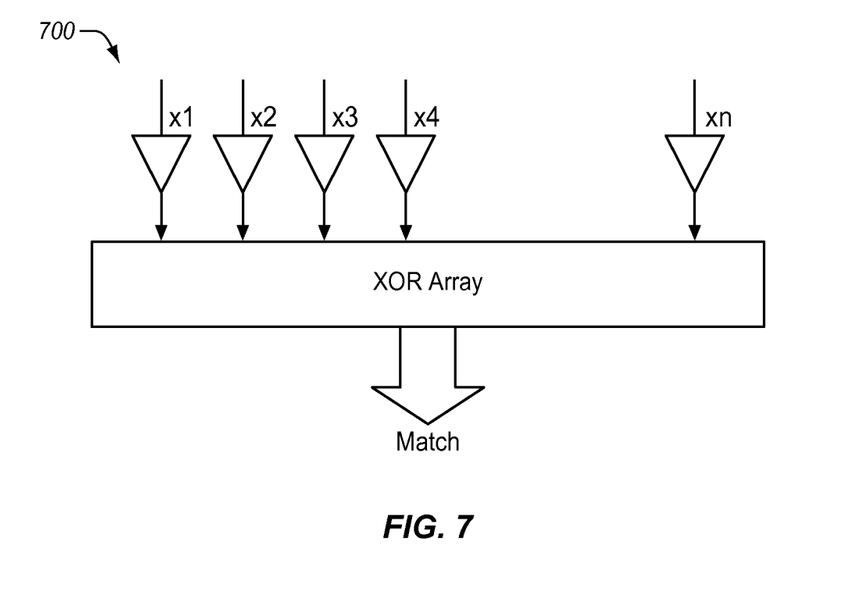
FIG. 7 is a perspective view illustrating a design of a transmission gate utilized by a stegnosystem smart card device, according to an example embodiment.

FIG. 7 is a perspective view illustrating a design of a transmission gate (block 700) utilized by a stegnosystem smart card device, according to an example embodiment. Block 700 may be used as an alternative design to the XOR gate described in FIG. 6. In order to determine a match between input data and a value stegnographed within a smart card, block 700 takes n number of bits and applies an exclusive-or to the bits to determine a match.

Exemplary Hardware and Operating Environment

This section provides an overview of one example of hardware and an operating environment in conjunction with which embodiments of the present disclosure may be implemented. In this exemplary implementation, a software program may be launched from a non-transitory computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 9 below.

Figure 8:
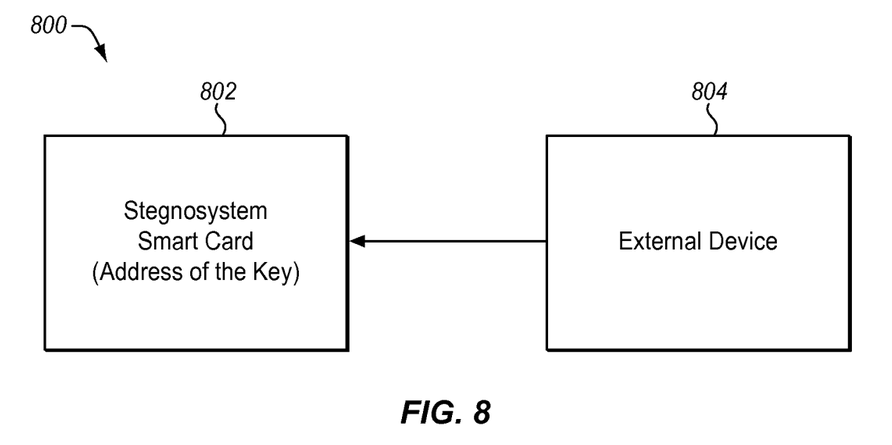
FIG. 8 is a block diagram illustrating a stegnosystem smart card device, according to an example embodiment.

FIG. 8 is a block diagram illustrating a stegnosystem smart card apparatus, according to an example embodiment. The stegnosystem smart card apparatus is an example embodiment of the stegnographic smart card 102 and external device 106 referenced in the smart card authentication system 100 described in FIG. 1. Block 800 comprises a stegnosystem smart card (block 802) and an external device (block 804). The stegnosystem smart card 802 may be any smart card device having a processor or microprocessor.

Sensitive data may be hidden in the memory of the stegnosystem smart card 802, wherein the stegnosystem smart card 102 produces a secret key and encrypts an address of the secret key stored in its smart card memory. The encrypted location of the secret key may be transmitted by the stegnosystem smart card 802 to an external device 804. In one embodiment, the secret key may be loaded into the memory of the stegnosystem smart card 802 during card initialization. In an alternative embodiment, the secret key may be generated after card initialization.

The external device 804 may interface with the stegnosystem smart card 802 to receive the address of the secret key. The address of the smart card secret key may be decrypted by the external device 804 revealing the location of the sensitive data hidden in the memory of the stegnosystem smart card 802. A user (such as the user 104 referenced in FIG. 1) may input data into the external device 804 for comparison to the sensitive data hidden in the memory of the stegnosystem smart card 802. If the input data matches the sensitive data, the stegnosystem smart card 802 may be accepted. In block 800, the external device 804 may act as an external power supply for the stegnosystem smart card 802. According to one embodiment, the external device 804 may be a smart card acceptor device.

Figure 9:
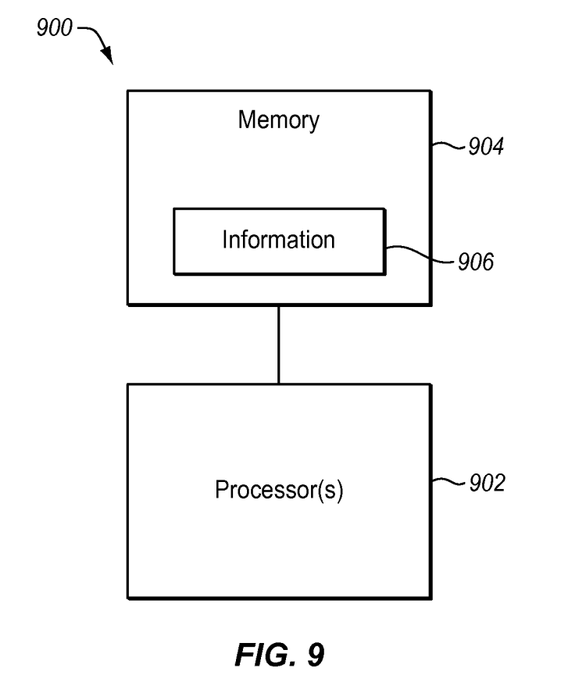
FIG. 9 is a block diagram illustrating a smart card computer system, according to an example embodiment.

FIG. 9 is a block diagram illustrating a smart card computer system, according to an example embodiment. Such embodiments may comprise a computer, a memory system, a magnetic or optical disk, some other storage device, or any type of electronic device or system. The computer system 900 may include one or more processor(s) 902 coupled to a non-transitory machine-accessible medium such as memory 904 (e.g., a memory including electrical, optical, or electromagnetic elements). The medium may contain associated information 906 (e.g., computer program instructions, data, or both) which when accessed, results in a machine (e.g., the processor(s) 902) performing the activities previously described herein.

This has been a detailed description of some exemplary embodiments of the present disclosure contained within the disclosed subject matter. The detailed description refers to the accompanying drawings that form a part hereof and which show by way of illustration, but not of limitation, some specific embodiments of the present disclosure, including a preferred embodiment. These embodiments are described in sufficient detail to enable those of ordinary skill in the art to understand and implement the present disclosure. Other embodiments may be utilized and changes may be made without departing from the scope of the present disclosure.

Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the present disclosure lies in less than all features of a single disclosed embodiment. Thus, the following claims are hereby incorporated into the Detailed Description, with each claim standing on its own as a separate preferred embodiment.

It will be readily understood to those skilled in the art that various other changes in the details, material, and arrangements of the parts and method stages which have been described and illustrated in order to explain the nature of this disclosure may be made without departing from the principles and scope as expressed in the subjoined claims.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

What is claimed is:

1. A non-transitory computer readable medium comprising executable instructions which when performed on a computer cause the computer to perform a method to authenticate a smart card user, the method comprising:

storing a password in a hidden memory location of a smart card;

transmitting data representing the hidden memory location of the password stored within the smart card to an external device;

accessing the hidden memory location of the password stored within the smart card; and comparing the password stored within the smart card to input data entered into the external device to restrict access to operations of the smart card to an appropriate user.

2. The non-transitory computer readable medium of claim 1, further comprising confirming the password stored within the smart card matches the input data entered into the external device.

3. The non-transitory computer readable medium of claim 1, further comprising randomizing the hidden memory location within the smart card in which the password is stored.

4. The non-transitory computer readable medium of claim 3, wherein the memory of the smart card is volatile.

5. The non-transitory computer readable medium of claim 1, wherein the external device is a smart card acceptor device.

6. The non-transitory computer readable medium of claim 1, wherein storing further comprises encrypting the hidden memory location of the smart card with the password stored therein.

7. The non-transitory computer readable medium of claim 1, wherein accessing the hidden memory location further comprises decrypting the hidden memory location of the smart card.

8. The non-transitory computer readable medium of claim 1, wherein comparing the password stored within the smart card further comprises utilizing an XOR gate to compare the password stored in the smart card to the input data entered into the external device.

9. The non-transitory computer readable medium of claim 1, wherein storing further comprises producing a stegnographic key corresponding to the hidden memory location where the password is hidden.

10. A non-transitory computer readable medium comprising executable instructions which when performed on a computer cause the computer to perform a method to program a password into a smart card, the method comprising:
   generating a password;
   hiding the password in a specific memory location of a smart card;
   generating a smart card encrypted key corresponding to the specific memory location of the password; and
   saving the key so that decryption is required to access the specific memory location of the smart card.

11. The non-transitory computer readable medium of claim 10, wherein hiding further comprises storing the password in volatile memory.

12. The non-transitory computer readable medium of claim 10, wherein hiding further comprises storing the password in non-volatile memory.

13. The non-transitory computer readable medium of claim 10, wherein generating of a password occurs more than once.

14. The non-transitory computer readable medium of claim 10, wherein the hiding of the password is randomized.

15. The non-transitory computer readable medium of claim 10, wherein generating of a password occurs prior to initial use of the smart card.

16. A computer system to authenticate a smart card user comprising:
   a stegnographic module to hide a password stored in a memory location of a smart card;
   a communication module to allow the smart card to interact with an external device; and
   a security module to encrypt and decrypt the memory location of the password stored on the smart card.

17. The computer system of claim 16, wherein the communication module allows the external device to access the memory location of the smart card wherein the hidden password is stored upon authentication.

18. The computer system of claim 16, wherein the security module utilizes cryptography to generate a key system to secure the memory location of the smart card.

19. The computer system of claim 16, wherein the communication module sends an encrypted key from the memory location of the smart card to the external device.

20. The computer system of claim 16, wherein the external device is a smart card acceptor device.

21. A smart card apparatus comprising:
   a stegnosystem smart card including:
      sensitive data hidden in its smart card memory, wherein the stegnosystem smart card produces a secret key and encrypts an address of the secret key stored in the smart card memory; and an interface to an external device to receive the address of the secret key to confirm access of an authorized user to operations associated with the smart card.

22. The smart card device of claim 21, wherein the external device is a smart card acceptor device.

23. The smart card device of claim 21, wherein the external device decrypts the address of the secret key stored on the smart card to confirm the access to the operations.

* * * * *